United States Patent
Kirby

(10) Patent No.: US 11,845,411 B2
(45) Date of Patent: Dec. 19, 2023

(54) ACTIVE BRAKE LOCKING SYSTEM

(71) Applicants: Patrick Joseph Frawley, Balwyn (AU); Steven James Kirby, The Basin (AU)

(72) Inventor: Steven James Kirby, The Basin (AU)

(73) Assignees: Patrick Joseph Frawley; Steven James Kirby

( * ) Notice: Subject to any disclaimer, the term of this patent is extended or adjusted under 35 U.S.C. 154(b) by 817 days.

(21) Appl. No.: 16/964,761

(22) PCT Filed: Jun. 3, 2019

(86) PCT No.: PCT/AU2019/000071
§ 371 (c)(1),
(2) Date: Jul. 24, 2020

(87) PCT Pub. No.: WO2019/237143
PCT Pub. Date: Dec. 19, 2019

(65) Prior Publication Data
US 2021/0053541 A1    Feb. 25, 2021

(30) Foreign Application Priority Data
Jun. 12, 2018   (AU) ................................ 2018902099

(51) Int. Cl.
| | |
|---|---|
| B60T 13/66 | (2006.01) |
| B60T 7/16 | (2006.01) |
| B60R 25/08 | (2006.01) |
| B60R 25/33 | (2013.01) |
| B60T 13/68 | (2006.01) |
| B60T 17/16 | (2006.01) |

(52) U.S. Cl.
CPC ............ B60T 13/662 (2013.01); B60R 25/08 (2013.01); B60R 25/33 (2013.01); B60T 7/16 (2013.01); B60T 13/686 (2013.01); B60T 17/16 (2013.01); *B60R 2325/207* (2013.01)

(58) Field of Classification Search
CPC ... B60R 25/08; B60R 25/33; B60R 2325/207; B60T 7/16; B60T 13/662; B60T 13/686; B60T 17/16
See application file for complete search history.

(56) References Cited

U.S. PATENT DOCUMENTS

| | | | | |
|---|---|---|---|---|
| 4,765,362 A | * | 8/1988 | Baruch .................... | B60R 25/02 70/237 |
| 2009/0158790 A1 | * | 6/2009 | Oliver ................... | B60R 25/005 70/202 |
| 2019/0366988 A1 | * | 12/2019 | Goodman ............. | B60R 25/102 |

* cited by examiner

*Primary Examiner* — Dale Moyer
(74) *Attorney, Agent, or Firm* — PETE ADAMS LAW, PLLC

(57) ABSTRACT

An active brake locking system has one or more valves in communication with an existing hydraulic vehicle system; one or more actuators controlling operation of the one or more valves; and a power source electrically connected to one or more processors and a media storage device, wherein the one or more actuators control a flow of fluids within the existing vehicle system.

4 Claims, 3 Drawing Sheets

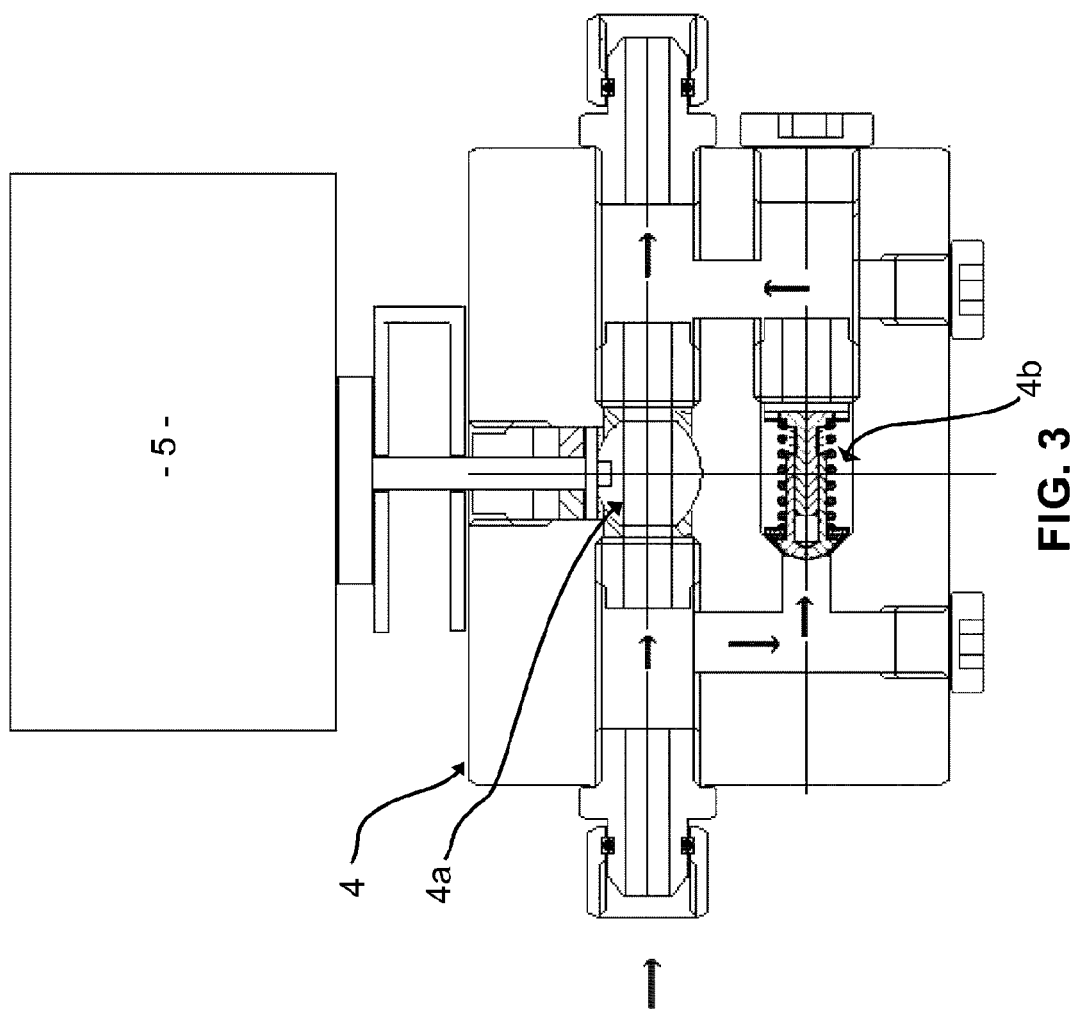

ACTIVE BRAKE LOCKING SYSTEM

BACKGROUND OF THE INVENTION

1. Field of Invention

The present invention relates to the field of hydraulic locking systems, and more particularly to a hydraulic locking system for an automotive brake assembly.

2. Description of Related Art

A vehicle can be a substantial financial investment. Accordingly, protection against theft is crucial to prevent loss. While insurance may exist to reimburse the loss, it is often at a fraction of the vehicle's value and is generally accompanied by significant amount of actions necessary from the vehicle owner to the insurance company.

Rather than rely on subsequent remedial measures to compensate the vehicle owner in the case of loss of the vehicle, people generally implement certain measures to prevent the loss from occurring. Vehicles are generally manufactured with locking mechanisms to prevent access from unauthorized individuals to the interior of the vehicle. Further, the ignition and starting process of the vehicle is generally associated with a specific key fabricated to provide unique access to the ignition of the vehicle.

While these manufactured protections are usually standard, they are antiquated as evidenced by the large number of vehicle thefts yearly. Whether an unauthorized individual would break a locking mechanism to gain access, fabricate a universal or "slam" key, steal the original keys from the vehicle owner, or forcibly take the car from the owner's concurrent possession, unauthorized individuals are able to access and deprive the owner from the use of the vehicle.

After a theft has taken place, the owner is then required to rely on law enforcement or another agency to locate and return the vehicle, if possible. Alternative outcomes include the vehicle having been severely damaged or stripped and sold for parts.

A remote/preset locking mechanism that prohibits displacement of the vehicle is necessary and the rationale behind the current invention. Passive locking systems, as described above may prevent or create and obstacle for someone to gain unauthorized access, but they fail to prevent use of the vehicle after unauthorized access has occurred.

Current attempts to address this issue involve additional braking systems within a vehicle but fail to provide the adaptability and control of the present invention. Requiring presetting a braking system within the vehicle would inherently allow for an individual to deactivate the braking system once they have gained access to the vehicle interior. For example, U.S. Pat. No. 7,191,862 entitled "Apparatus for stopping a vehicle", by Wattenburg et al. discloses therein an apparatus for externally controlling one or more brakes on a vehicle having a pressurized fluid braking system. The apparatus can include a pressurizable vessel that is adapted for fluid-tight coupling to the braking system. Impact to the rear of the vehicle by a pursuit vehicle, shooting a target mounted on the vehicle or sending a signal from a remote control can all result in the fluid pressures in the braking system of the vehicle being modified so that the vehicle is stopped and rendered temporarily inoperable. A control device can also be provided in the driver's compartment of the vehicle for similarly rendering the vehicle inoperable. A driver or hijacker of the vehicle preferably cannot overcome the stopping action from the driver's compartment.

Another example is provided in U.S. Pat. No. 6,874,602 entitled "Braking apparatus for a vehicle", by Greaves disclosing a braking apparatus used to brake a vehicle having brakes actuated by a power boost in response to the movement of a brake pedal has a vacuum source adapted to be operably connectable to a vacuum conduit network, the vacuum conduit network being adapted to be operably connectable to a vacuum control valve, the vacuum conduit network further being adapted to be operably connectable to the power boost of the vehicle. The braking apparatus also includes a vacuum actuated servo mechanism adapted to be operably connectable to receive vacuum from the vacuum control means as directed by an electronic controller, the vacuum then being capable of actuating the vacuum actuated servo mechanism to move between a resting position and a braking position. The braking apparatus further includes a connection cable adapted to be mechanically connectable to both the vacuum actuated servo mechanism and the brake pedal of the vehicle such that the vacuum actuated servo mechanism and the brake pedal move responsively.

Neither of the above examples allow for the remote communication and control of the braking system by the owner or other authorized controlling parties. Again, having to control the braking system from within the vehicle may only provide a momentary addition to the time needed by a thief or hijacker from being able to operate the vehicle.

Based on the foregoing, there is a need in the art for a device, which will allow a user to remotely control a positive system for the prohibition of displacement of the vehicle. A system is needed that will provide alerts and allow for monitoring of a vehicle with the ability to arrest any movement of the vehicle from any location.

SUMMARY OF THE INVENTION

An active brake locking system has one or more valves in communication with an existing hydraulic vehicle system; one or more actuators controlling operation of the one or more valves; and a power source electrically connected to one or more processors and a media storage device, wherein the one or more actuators control a flow of fluids within the existing vehicle system.

In some embodiments, the one or more valves selectively allow the flow of fluids in a direction within one or more hydraulic lines of the existing vehicle system.

In some embodiments, the flow of fluids is allowed to proceed in a single direction until the system is disengaged.

In some embodiments, the flow of fluids within the existing vehicle system control operation of brakes, wherein the brakes are in communication with one or more wheels, wherein the brakes prevent rotation of the one or more wheels when the system is engaged.

In some embodiments, the flow of fluids within the existing vehicle system controls operation of the clutch, wherein the clutch is in communication with the engine, wherein the clutch prevents translation of rotational movement from the engine to one or more wheels.

In some embodiments, the system further comprises a wireless communication means configured to communicate with a remote device, wherein the remote device selectively engages or disengages the system.

In some embodiments, the system is autonomously activated, wherein one or more threshold values are stored within the media storage device, wherein when at least one of the one more ore threshold values is breached, the system becomes engaged, wherein the system is engaged when the vehicle is prevented from moving.

In some embodiments, an alert is provided to a remote device when the system is engaged.

The foregoing, and other features and advantages of the invention, will be apparent from the following, more particular description of the preferred embodiments of the invention, the accompanying drawings, and the claims.

In a first aspect the present invention is an active brake locking system comprises:
  one or more valves in communication with an existing hydraulic vehicle system;
  one or more actuators controlling operation of the one or more valves; and
  a power source electrically connected to one or more actuators and one or more processors and a media storage device, wherein the one or more actuators control a flow of fluids within the existing vehicle system.

Preferably the one or more valves selectively allow the flow of fluids in a direction within one or more hydraulic lines of the existing vehicle system.

Preferably the flow of fluids is allowed to proceed in a single direction until the system is disengaged.

Preferably in one embodiment the flow of fluids within the existing vehicle system control operation of brakes, wherein the brakes are in communication with one or more wheels, wherein the brakes prevent rotation of the one or more wheels when the system is engaged.

Preferably in another embodiment the flow of fluids within the existing vehicle system controls operation of the clutch, wherein the clutch is in communication with the engine, wherein the clutch prevents translation of rotational movement from the engine to one or more wheels.

Preferably the system further comprising a wireless communication means configured to communicate with a remote device, wherein the remote device selectively engages or disengages the system.

Preferably the system is autonomously activated, wherein one or more threshold values are stored within the media storage device, wherein when at least one of the one more ore threshold values is breached, the system becomes engaged, wherein the system is engaged when the vehicle is prevented from moving.

Preferably wherein an alert is provided to a remote device when the system is engaged.

In a second aspect the present invention is an active brake locking system comprising:
  a. at least one valve assembly in communication with a hydraulic system of a an automotive vehicle, and said valve assembly allows a flow of fluid within at least one hydraulic line of said hydraulic system and said valve assembly comprises at least a first flow valve and second check valve;
  b. at least one actuator for controlling said first flow valve;
  c. a power source electrically connected to said actuator and at least one processor and media storage device; and
wherein said first flow valve and said second check valve are disposed in parallel, so that in use when said first flow valve is open said fluid may flow in both directions of said first flow valve and when said actuator is actuated to close said first flow valve, said fluid is then restricted to flow in only one direction through said second check valve.

Preferably in one embodiment said hydraulic system is the brake hydraulic system, and when said actuator has actuated to close said first flow valve, said flow through said second check valve in a single direction allows for the brakes of said vehicle to prevent rotation of at least one wheel of said vehicle.

Preferably in another embodiment said hydraulic system is the clutch hydraulic system controlling the operation of the clutch of the vehicle which is in communication with engine of said vehicle, and when said actuator has actuated to close said first flow valve, said flow through said second check valve in a single direction preventing modulation of the communication between said engine and said clutch.

Preferably the system further comprising wireless communication means operably connected to said processor and configured to communicate with a remote device, wherein said remote device selectively engages or disengages said active brake locking system.

Preferably said system is autonomously activated, wherein at least one threshold value is stored within said media storage device, wherein said at least one storage value is breached, said system becomes engaged by actuation of said actuator to prevent said vehicle from moving.

Preferably an alert is provided to a remote device when system is engaged.

In a third aspect the present invention is an active brake locking system adapted to be installed in an existing automotive vehicle, said system comprising:
  a. a valve assembly which is installed in-line with at least one hydraulic line of a hydraulic system of said vehicle, said valve assembly comprises at least a first flow valve and second check valve;
  b. at least one actuator for controlling said first flow valve;
  c. a power source electrically connected to said actuator and at least one processor and media storage device; and
wherein said first flow valve and said second check valve are disposed in parallel, so that in use when said first flow valve is open fluid may flow in both directions of said hydraulic line through said first flow valve, and when said actuator is actuated to close said first flow valve, said fluid is then restricted to flow in only one direction of said hydraulic line through said second check valve.

Preferably said hydraulic system is the brake hydraulic system, and when said actuator has actuated to close said first flow valve, said flow through said second check valve in a single direction allows for the brakes of said vehicle to prevent rotation of at least one wheel of said vehicle, and said brakes remain engaged so long as said first flow valve remains closed.

Preferably the system further comprising wireless communication means operably connected to said processor and configured to communicate with a remote device, wherein said remote device selectively engages or disengages said active brake locking system.

Preferably said system is autonomously activated, wherein at least one threshold value is stored within said media storage device, wherein said at least one storage value is breached, said system becomes engaged by actuation of said actuator to prevent said vehicle from moving.

Preferably said at least one threshold value is related to the location of said vehicle provided by a GPS tracker fitted to said vehicle.

Preferably an alert is provided to a remote device when system is engaged.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 3 is a cross sectional schematic of the valve assembly for the active brake locking system of FIG. 1, where the ball valve and check valve are shown contained in a single valve block unit.

DETAILED DESCRIPTION OF PREFERRED EMBODIMENTS

Figure 1:
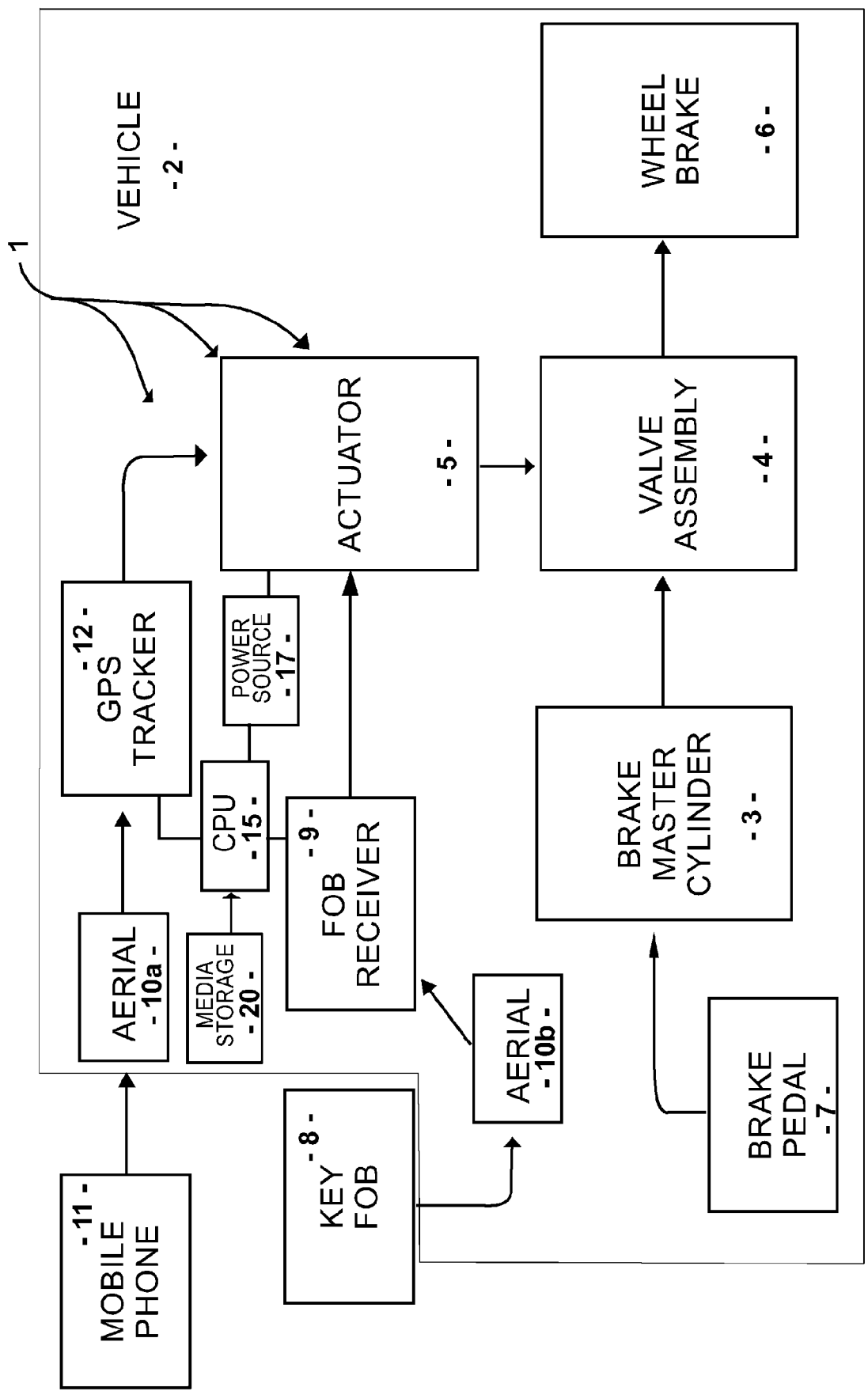
FIG. 1 is a block diagram of a vehicle fitted with the active brake locking system, according to an embodiment of the present invention.
Figure 2:
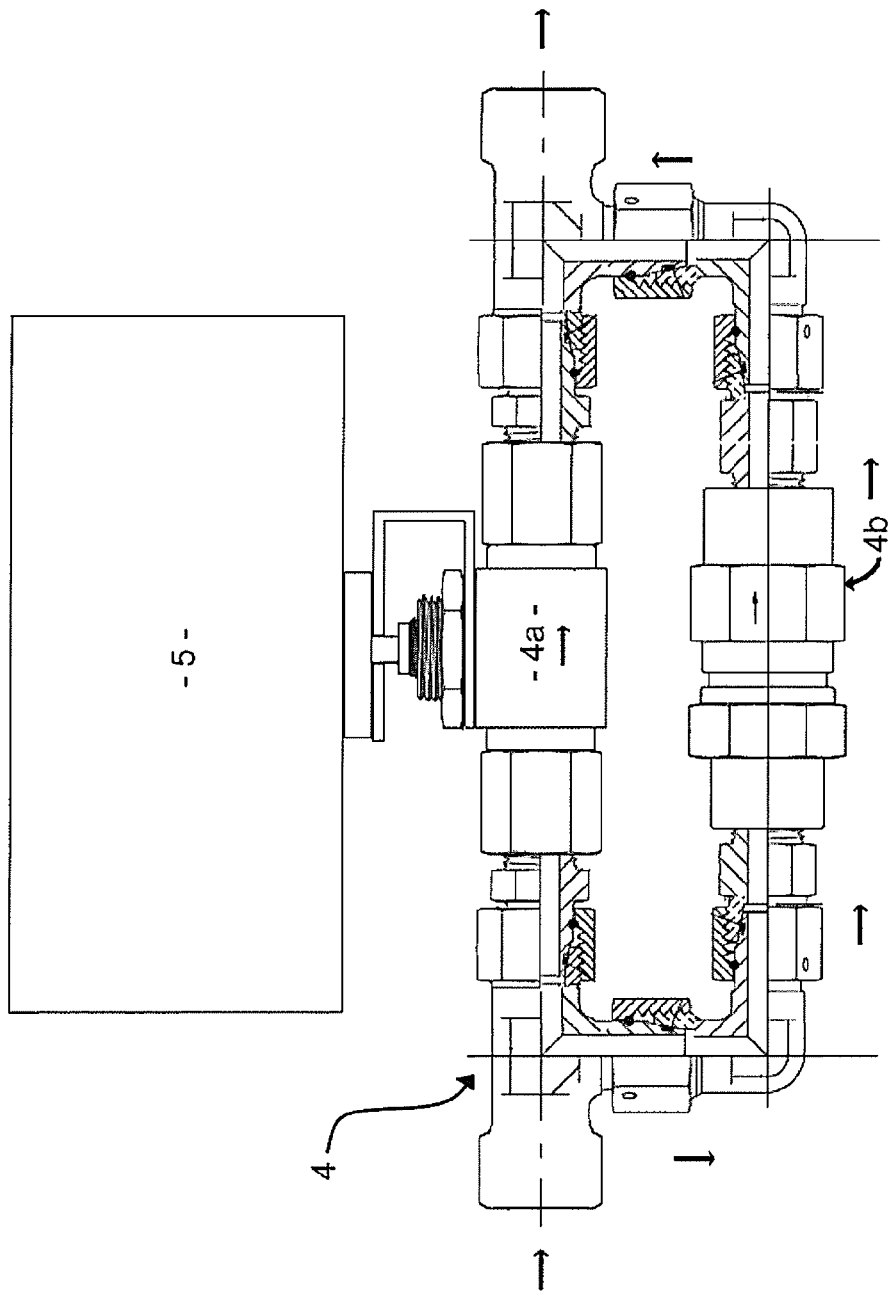
FIG. 2 is a schematic view of the valve assembly and actuator of the active brake locking system shown in FIG. 1.

Preferred embodiments of the present invention and their advantages may be understood by referring to FIGS. 1 to 3.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s)

of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described.

An active brake locking system is installed into a vehicle and in communication with one or more existing vehicle system relating to the movement and function of the vehicle. Hydraulic pressure is provided by the active brake locking system to prevent the existing vehicle systems from operating. A hopper or reservoir is provided to retain one or more fluids. Flow of the one or more fluids within the system are controlled by a plurality of valves controlled by actuators. Check valves may be provided to allow for unidirectional flow of fluids within the active brake locking system and/or the existing vehicle systems.

In some embodiments, the active brake locking system is installed in-line with the hydraulic lines of the vehicle's existing brake system. In some embodiments, the in-line installation provides for the flow of brake fluid throughout the existing brake system of the vehicle and the flow of the fame fluid through the active brake locking system, whereby the active brake locking system controls the flow or lack of flow throughout the vehicle's existing brake system.

In some embodiments, the in-line installation of the active brake locking system may provide for a diversion of the flow of fluid within the vehicle's existing brake system.

The hopper or reservoir is in communication with the plurality of valves through tubing or piping configured to direct the flow of fluids within the active brake locking system between the hopper and the plurality of valves.

In some embodiments, the active brake locking system has a pump in communication with the tubing or piping. The pump may be electrically driven or mechanically driven. In such an embodiment, the fluid within the active brake locking system flows into the pump and the pump forces the fluid throughout the system at an increased pressure.

In some embodiments, the fluid is a non-compressible fluid. The compression or lack of compression of the fluid may be adapted based on the function of the system and the requirements for the pressure to operate the opening and closing of the plurality of the valves. In some embodiments, the fluid may be a gas.

In some embodiments, the existing vehicle systems are controlled or operated under specific hydraulic pressure conditions. For example, a standard vehicle brake system uses hydraulic pressure initiated by depression of a brake pedal to engage calipers and subsequently brake pads resulting in contact between the pads and a rotor, which is mechanically attached to the axle of the vehicle.

In some embodiments, the existing vehicle system is the hydraulic brake system. In other embodiments, the existing vehicle system is the clutch and transmission system. Where the existing vehicle system is a clutch system, the active brake locking system is in communication with one or more hydraulic lines containing fluids, which operate the clutch system. The clutch system is responsible for modulating a communication between rotation of the engine to the one or more axles of the vehicle. Generally, a clutch system allows a user to select gears depending on the necessary ration of rotation of the motor to rotation of the axles through the transmission. Similar to the existing braking system, the user depresses a clutch pedal and hydraulic pressure is applied to one or more cylinders acting as actuators to physically separate the clutch discs from the engine of the vehicle. The clutch is an intermediary component between the engine and the transmission. The transmission rotates correspondingly to the rotation of the one or more clutch discs.

In another embodiment, the active brake locking system provides for a self-contained hydraulic operation having a fluid contained within the hopper or reservoir such that the fluid of the self-contained hydraulic embodiment is configured to displace and otherwise adjust the operation of the one or more valves contained therein. In a non-limiting example, the active brake locking system having self-contained hydraulic operation is activated by the user such that the fluid is transferred from the hopper or reservoir with sufficient pressure to open or close the valves contained within the system. After the system is activated, the fluid acts on the valves, which in turn act on the flow of fluid within the vehicle's braking system preventing the release of the brakes until the user disengages the self-contained active brake locking system.

In some embodiments, the active brake locking system is in communication with more than one existing vehicle system. For example, the system may be adapted to control the flow of fluids within the vehicle's braking system. For example, the system may also be adapted to control the flow of fluids within the vehicle's fuel system. For example, The system may also be adapted to control the flow of fluids within the vehicle's transmission system. In any embodiment, the system may be in communication with one or more of the vehicle's systems as described herein.

The active brake locking system is installed into one or more of the hydraulic lines of the existing vehicle system. The one or more hydraulic lines are configured to direct a flow of one or more fluids within the existing vehicle system. The active brake locking system is installed such that the flow of fluid within the one or more hydraulic lines is directed within the active brake locking system.

In a particular embodiment shown in FIGS. 1 to 3, active brake locking system 1 has an actuator 5 to actuate or control valve assembly 4. The valve assembly 4, has a two-way ball valve 4*a* and one-way check valve 4*b* connected in parallel therewith, such that when ball valve 4*a* is actuated by actuator 5 active brake locking system 1 allows the flow of brake fluid within the existing vehicle brake system to flow in one direction via check valve 4*b*. The one direction is in favor of the brake pads of wheel brake 6 engaging the rotor (not shown), thereby preventing the wheels (not shown) from rotating. The communicative force between the rotor and the brake pads is sufficient to overcome a rotational force translated to the wheel from the engine (not shown) via the transmission (not shown). Accordingly, this action keeps the brakes 6 engaged at the given brake pressure and cannot be released until active brake locking system 1 is disengaged by an authorized user (not shown).

FIG. 2 shows how valve assembly 4, could be made from known components, namely a ball valve 4*a* and a check valve 4*b* connected thereto in parallel. However, it is more preferable to have ball valve 4*a* and check valve 4*b* of valve assembly 4 contained in a single block (housing) or unit, as shown in FIG. 3.

What should be understood in simplified terms is that when system 1 is fitted to a vehicle 2, a user is capable of using a conventional brake pedal 7 and to actuate wheel brakes 6 via brake master cylinder 3 (which is within the hydraulic brake system of vehicle 2). Normally when the active brake lock system 1 is not actuated the wheel brakes 6 will release when the user removes their foot from brake pedal 7. However, when active brake lock system 1 is activated, valve assembly 4, via check valve 4*b* ensures that the wheel brakes 6 become engaged and/or remain engaged even when brake pedal 7 is not depressed, thus preventing vehicle 2 from moving.

Alternatively, active brake locking system 1 could be in communication with the clutch system (not shown) existing in the vehicle, rather than the brake system. In such arrangement the flow of hydraulic fluid controlling operation of the clutch system is also allowed to flow in a singular direction, thereby preventing modulation of the communication between the engine and the clutch. For example, where the clutch is arrested in a position where the clutch plates are contacting the engine, the engine will stall based on the prevention of the rotation of the crankshaft by the contacting clutch plates. Alternatively, where the clutch plates are prevented from contacting the engine, the vehicle will be incapable of translating rotational forces from the engine to the wheels through the transmission and clutch systems. The block diagram of FIG. 1, whilst representative of the earlier described wheel brake system embodiment, would be similar to the "not shown" clutch system of vehicle 2, where the brake pedal 7, brake master cylinder 3 and wheel brake 6, are respectively replaced by a clutch pedal, clutch master cylinder, and clutch.

In some embodiments, the authorized user is typically the owner of vehicle 2 and in other embodiments, the authorized user is an approved law enforcement officer or agency. The authorized user is in remote communication with active brake locking system 1 through one or more remote devices. For example, the remote device may be a cellular (mobile) phone 11 being in wireless communication with active brake locking system 1 via an aerial 10a fitted to vehicle 2, as shown in FIG. 1. In such an embodiment, active brake locking system 1 is in communication with a power source 17. The power source 17 may be separate and contained within active brake locking system 1. A computer processing unit (CPU) 15 is electrically connected to a wireless transmitter and receiver configured to transmit and receive data from one or more remote sources or devices. A media storage device 20 may be disposed and connected to CPU 15. The media storage device 20 may be programmed to retain authorization and authentication data to authenticate the remote device to access and control the active brake locking system.

In some embodiment, the authorized user establishes a pin as authentication of the remote device to access active brake locking system 1. The user is able to release the brakes using the remote device with one or more commands programmed into a user interface on the remote device.

In some embodiment, a tracking system is programmed into active brake locking system 1. The tracking system, in the form of a GPS tracker 12 allows active brake locking system 1 to provide the authorized user information about attempted access to the vehicle 2, and its geographical location, and may provide for threshold values for autonomous activation of the system. For example, the autonomous activation allows system 1 to determine one or more of the threshold values has been breached, which results in active brake locking system 1 to actuate valve assembly 4 from any location. The threshold values may be an unauthorized displacement of vehicle 2 or attempted starting of vehicle 2 by an unauthorized user. A specific example may provide for active brake locking system 1 to become engaged when vehicle 2 moves in faster speed and in accordance to the brake pressure applied by the driver and the device also alerts the law enforcement of the vehicle.

In addition to the remote device of mobile phone 11, a key fob 8 and fob receiver 9 via aerial 10b, could be used to activate/deactivate system 1 when key fob 8 is a short distance, say about three meters from vehicle 2. Aerial 10b used for the fob receiver may be integral with aerial 10a used for the mobile phone.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

The invention claimed is:

1. An active brake locking system adapted to be installed in an existing automotive vehicle, the system comprising:
 a. a valve assembly which is installed in-line with at least one hydraulic line of a hydraulic system of the vehicle, the valve assembly comprises at least a first flow valve and second check valve;
 b. at least one actuator for controlling the first flow valve;
 c. a power source electrically connected to the actuator and at least one processor and media storage device; and
 wherein:
 i. the first flow valve and the second check valve are disposed in parallel, so that in use when the first flow valve is open fluid may flow in both directions of the hydraulic line through the first flow valve, and when the actuator is actuated to close the first flow valve, the fluid is then restricted to flow in only one direction of the hydraulic line through the second check valve;
 ii. when the system is autonomously activated, at least one threshold value is stored within the media storage device, and when the at least one threshold value is breached, the system becomes engaged by actuation of the actuator to prevent the vehicle from moving; and
 iii. the at least one threshold value is related to the location of the vehicle provided by a GPS tracker fitted to the vehicle.

2. The system of claim 1, wherein the hydraulic system is the brake hydraulic system, and when the actuator has actuated to close the first flow valve, the flow through the second check valve in a single direction allows for the brakes of the vehicle to prevent rotation of at least one wheel of the vehicle, and the brakes remain engaged so long as the first flow valve remains closed.

3. The system of claim 1, further comprising wireless communication means operably connected to the processor and configured to communicate with a remote device, wherein the remote device selectively engages or disengages the active brake locking system.

4. The system of claim 1, wherein an alert is provided to a remote device when the system is engaged.

* * * * *